United States Patent [19]

Wakamori et al.

[11] Patent Number: 5,408,474

[45] Date of Patent: Apr. 18, 1995

[54] APPARATUS FOR MULTIPLEXING DIGITAL VIDEO AND A DIGITAL SUB-SIGNAL AND METHOD THEREOF

[75] Inventors: Kazuhiko Wakamori; Hiroshi Tsuchiya, both of Hamamatsu, Japan

[73] Assignee: Hamamatsu Photonics K.K., Hamamatsu, Japan

[21] Appl. No.: 895,832

[22] Filed: Jun. 9, 1992

[30] Foreign Application Priority Data

Jun. 10, 1991 [JP] Japan .................... 3-137683

[51] Int. Cl.⁶ ............................................. H04J 3/04
[52] U.S. Cl. ............................ 370/112; 370/110.1; 358/336
[58] Field of Search .................. 370/112, 94.1, 94.2, 370/118, 110.4, 85.1, 110.1; 358/150, 151, 153, 336, 314

[56] References Cited

U.S. PATENT DOCUMENTS

| | | | |
|---|---|---|---|
| 4,417,275 | 11/1983 | Harshbarger et al. | 358/150 |
| 4,567,521 | 1/1986 | de la Guardia et al. | 358/150 |
| 4,733,312 | 3/1988 | Morimoto | 358/336 |
| 4,888,768 | 12/1989 | Michener | 370/102 |
| 5,034,823 | 7/1991 | Geerlings | 358/336 |
| 5,072,442 | 12/1991 | Todd | 370/110.1 |
| 5,138,440 | 8/1992 | Radice | 370/94.1 |
| 5,150,363 | 9/1992 | Mitchell | 370/112 |
| 5,170,395 | 12/1992 | Shinmyo | 370/110.1 |
| 5,280,479 | 1/1994 | Mary | 370/94.1 |

FOREIGN PATENT DOCUMENTS 61-9044 1/1986 Japan .
61-148983 7/1986 Japan .
2141195 5/1990 Japan .

OTHER PUBLICATIONS

H. J. Chao et al., "A Packet Video System Using the Dynamic Time Division Multiplexing Technique.", IEEE Global Telecommunications Conference & Exhibition, vol. 2, 28 Nov. 1988, Hollywood, Florida, pp. 767–772.

C. W. Lundgren et al., "Applications of Video on Fiber Cable."; IEEE Communications Magazine, vol. 24, No. 5, May 1986, Piscataway, New Jersey, pp. 33–49.

*Primary Examiner*—Douglas W. Olms
*Assistant Examiner*—Shick Hom
*Attorney, Agent, or Firm*—Cushman Darby & Cushman

[57] ABSTRACT

A system disclosed in the present invention comprises a video A/D converter for converting an analog video signal to a digital video signal, a sync separator for detecting a sync signal period of the analog video signal, an invalid data stream detector for detecting an invalid data stream of a digital sub-signal having the invalid data stream added thereto at a predetermined period, a selector for selecting the bits of the digital sub-signal, the digital video signal and a sync pattern in accordance with the detection outputs of the invalid data stream detector and the sync separator, and an encoder for converting the output of the selector to a serial signal.

15 Claims, 7 Drawing Sheets

APPARATUS FOR MULTIPLEXING DIGITAL VIDEO AND A DIGITAL SUB-SIGNAL AND METHOD THEREOF

BACKGROUND OF THE INVENTION

1. Field of the Invention

The present invention relates to a method and apparatus for multiplexing a video signal.

2. Related Background Art

The advancement of electronic technology is remarkable such technology is used in various fields. One of the advantages of using electronic technology is the ability of instantly transmitting signals such as various sounds, images or character data, which are essential in the present information-oriented world.

The signals which were transmitted in analog form in the past, are now being replaced by digital transmission because of advantages in the transmission quality. Audio signals are now commonly processed digitally. Advantages of the digital signals are that signal deterioration on a transmission line is low, high quality transmission is attained, cross-talk-free multiplexing is attained, mass transmission is attainable by using a light transmission technique such as an optical fiber, and signal processing which cannot be attained for an analog signal may be done by a computer. Audio signals may be digitized and transmitted with a data signal by a time division multiplex system. For example, in Japanese Laid-Open Patent Application 61-9044, a composite video signal including a digital sub-signal multiplexed by an audio signal and a data signal is PF-modulated for light transmission.

Recently, a trial has been made to digitize, not only an audio signal, but also a video signal for multiplex transmission. For example, Japanese Laid-Open Patent Application 2-141195 relates to a digital audio data format which facilitates multiplexing with a digital video signal. It includes measurement of data destroyed by the digital sub-signal which most likely occurs on a long distance transmission line. The multiplexed signal of the digital video signal and the digital sub-signal is usually a serial data stream having a format as shown in FIG. 1. In this format, a data stream 604, of the digital sub-signal, and a sync pattern 602 are added to a data stream 603, of the digital video signal to form one frame 601.

In order to separate the digital video signal and the digital sub-signal from the multiplexed signal, an apparatus as shown in FIG. 3 may be used. An operation of the apparatus is briefly explained below. When the sync pattern 602 is detected by a frame sync circuit 912, a control signal, synchronized with the sync pattern 602, is supplied to a decoder 911. In the decoder 911, the multiplexed signal is converted to a parallel signal, and an output timing of the parallel signal is timed by a control output from the frame sync circuit 912 so that it is separated to the digital video signal 904 and the digital sub-signal 902. Since the output of the decoder 911 is a parallel signal, it is supplied to a D/A converter 913 when an analog video signal output is required.

In Japanese Laid-Open Patent Application 61-148983, the digital sub-signal is temporarily stored in a memory. A special pattern for identification is added to the digital sub-signal read from the memory, and the digital sub-signal having the special pattern added to a portion corresponding to a sync signal period of the analog video signal is added to the data stream of the digital video signal to form one frame. FIG. 2 shows the frame In this method, the amount to be transmitted is reduced over than that of the format of FIG. 1.

When the multiplex transmission is performed by the format of FIG. 1, the amount to be transmitted increases as described in Japanese Laid-Open Patent Application 61-148983. Differential encoding of the video signal is done to prevent such an increase but, the differential encoding needs additional reproducing unit in a receiving station and the size of the apparatus increases.

Further, in the method of adding the digital sub-signal to the portion corresponding to the sync signal period of the analog video signal, to the data stream of the digital video signal as shown in FIG. 2, high access speed memories and circuitry for controlling the memories at a high speed are required both in the transmitting station and in the receiving station. In this case, the pattern design must take the high speed requirement and stable operation into consideration, and hence the design is hard to attain. Further, the digital sub-signal is reproduced with one frame delay.

Various methods have been proposed for video signal multiplexing transmission and a best method is being studied.

SUMMARY OF THE INVENTION

In the light of the above, it is an object of the present invention to provide a method and an apparatus for multiplexing a video signal attainable by a relatively simple circuit configuration with respect to the increase of amount of transmission data to be suppressed.

The signal multiplexing method of the present invention is characterized by converting an analog signal, having sync signal, to a first parallel digital signal, adding bits of a second digital signal having an invalid period added thereto at a predetermined period to the first digital signal to generate a third digital signal, and inserting a sync pattern into the third digital signal when an invalid period of the second digital signal and the sync signal period coincide.

In the present method, the analog signal is converted to the first parallel digital signal, bits of a second digital signal, having an invalid data stream thereto, are added to the first parallel digital signal, which is converted to the second digital signal having a sync pattern inserted thereto when the period of the invalid data stream of the second digital signal and the sync signal period of the analog signal coincide.

When the signal, thus multiplexed, is to be demodulated, the sync pattern of the frame sync signal is extracted from the data stream, and the period to which the sync pattern is inserted maintains the previous state. Accordingly, where the analog signal, including the sync signal, is a constant level signal such as an analog video signal, the affect of the neglected sync pattern period is eliminated by inserting a sync pattern into the sync signal section.

The signal multiplexer of the present invention comprises first means for converting an analog signal, having a sync signal, to a first parallel digital signal, second means for detecting a period of the sync signal; and and third means for adding bits of a second digital signal having an invalid data period added thereto at a predetermined period to the first digital signal to generate a third digital signal and inserting a sync pattern to the third digital signal, when the invalid period of the second digital signal and the sync period coincide, to provide a resultant signal.

A fourth means for converting the resultant signal of the third means to a serial signal may further be provided.

The first digital signal and the second digital signal are multiplexed in the serial signal, and a sync pattern is inserted at a period of a least multiple of the period of the invalid data stream of the second digital signal and the sync signal period.

As for the second digital signal having an invalid data stream added thereto, an invalid data stream is inserted by an invalid data stream inserter. Where it is desired to coincide with the sync signal period of the analog signal, an invalid data stream inserter, which inserts an invalid data stream to a digital sub-signal in accordance with the sync detection output from the second means, may be used.

The invalid period may have the invalid data stream inserted therein or it may be a non-use period having no data of the second digital signal therein.

Where an audio signal and a data signal are inputted, the audio signal and the data signal are time division multiplexed to produce the second digital signal. An invalid data stream may be inserted or the non-use period is provided in the second digital signal at a predetermined period for use as the invalid data to attain the same effect as that of the insertion of the invalid data stream.

The present invention will become more fully understood from the detailed description given hereinbelow and the accompanying drawings, which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENTS

Figure 4:
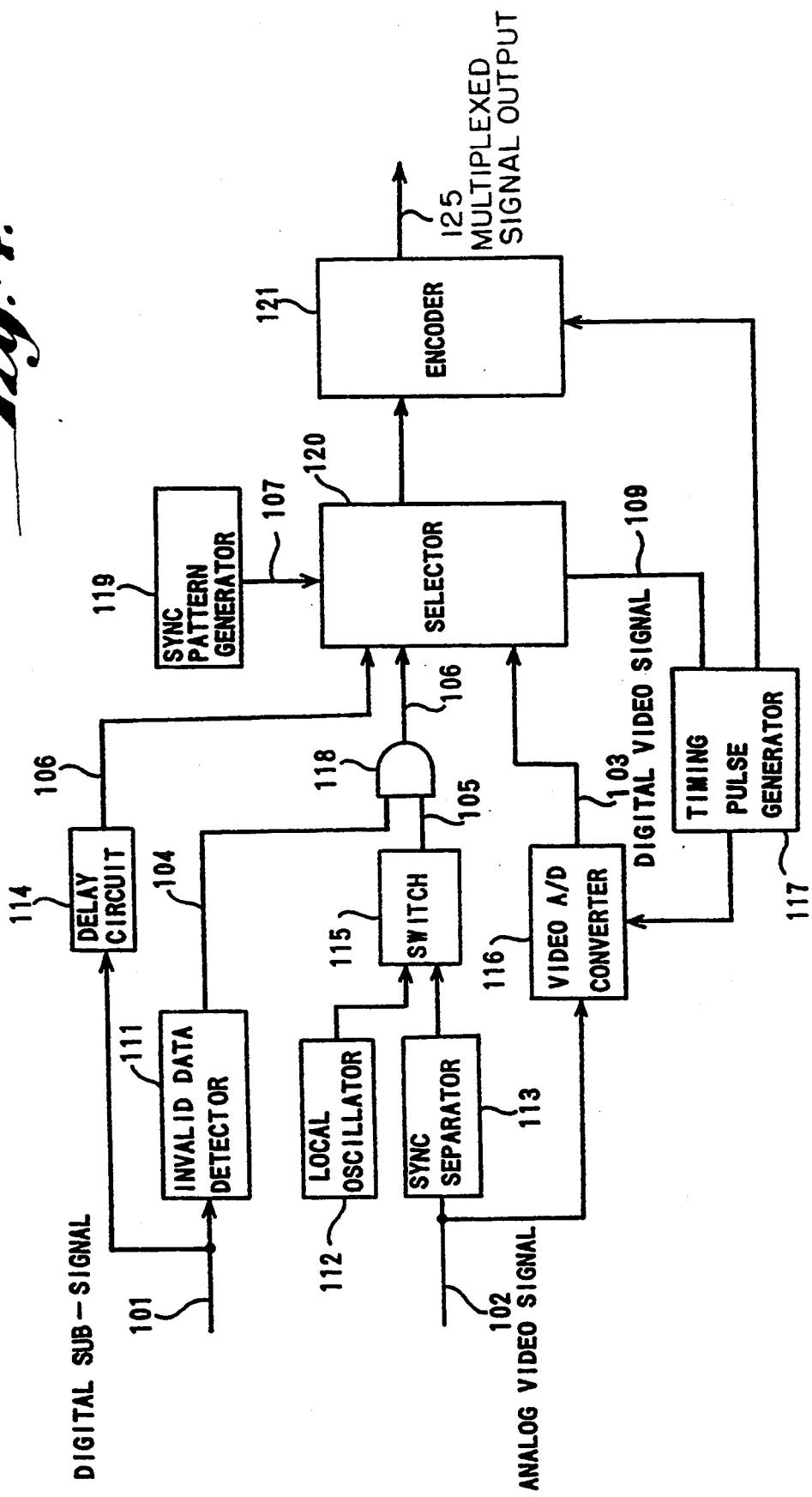
FIG. 4 shows a configuration of a first embodiment of the present invention.

Embodiments of the present invention are now explained with reference to FIGS. 4 to 10. FIG. 4 shows an apparatus used for a composite video signal multiplexing method in accordance with a first embodiment of the present invention. In the method of the present embodiment, a second digital signal having an invalid data stream inserted in an invalid period is used as a digital co-signal having the invalid data stream inserted therein. As for a digital sub-signal having no invalid data stream, an audio signal and a data signal are inputted and a non-use period is provided as the invalid period, and a digital sub-signal is generated in the apparatus, as shown in a second embodiment. In a third embodiment, a digital sub-signal having no invalid data sequence is inputted, and the invalid data stream is internally added during the invalid period.

A composite video signal multiplexer shown in FIG. 4 comprises a video A/D converter 116, a sync separator 113, an invalid data stream detector 111, a selector 120 and an encoder 121. It further comprises a local oscillator 112, a switch 115, a timing pulse generator 117, a delay circuit 114 and an AND circuit 118.

The video A/D converter 116 converts an analog video signal 102 to a digital video signal 103. Since high speed A/D conversion is required, a flash converter, which is available in the present technology, is usually used. The invalid data detector detects invalid data of an invalid data stream added to a digital sub-signal at a predetermined period. It is constructed by the same principle as that of the sync pattern detection by the frame sync circuit of FIG. 6. The sync separator 113 recovers a DC component of the analog video signal and detects a sync signal period. It is one which is usually used in a conventional television or video circuit. The local oscillator 112 generates the same signal as the sync signal of the analog video signal 102.

The selector 120, the sync pattern generator 119, the AND circuit 118 and the delay circuit 114 logically And the output 104 of the invalid data stream detector 111 and the output 105 of the switch 115 to produce at least one sync pattern when the period of the invalid data stream of the digital sub-signal and the sync period of the analog video signal coincide, and to produce the bits of the digital sub-signal 101 and the digital video signal 103 during other period.

The switch 115 selects the signal from the local oscillator 112 and supplies it to the selector 120 when the analog video signal 102 is absent as detected by the sync separator 113. The selector 120 selectively outputs the sync pattern 107 from the sync pattern generator 119 or the bits of the digital sub-signal 101 and the digital video signal 103 in accordance with the detection outputs of the invalid data stream detector 111 and the sync separator 113 under the control of the AND circuit 118 and the timing pulse from the timing pulse generator 117. It has a digital switching function. The delay circuit 114 delays the digital sub-signal 101 by one invalid data period so that the output of the invalid data stream detector 111 and the start time of the invalid data stream in the output coincide. The encoder 121 converts the output of the selector 120 to a serial signal.

The encoder 121 converts transmission data to a format required by a transmission line. It is a parallel-serial converter which converts the output of the selector 120 to the serial signal and supplies it as the multiplexed signal 105 under the control of a timing pulse from the timing pulse generator 117. In the absence of the analog video signal 102 for a predetermined time period, the local oscillator 112 and the switch 115 supply a dummy sync signal from the local oscillator 112 to the selector 120.

The timing pulse generator 117 supplies pulses for controlling operation timings to the video A/D converter 116, the selector 120 and the encoder 121. The sync pattern generator 119 supplies the sync pattern 107 to the selector 120. The delay circuit 114 delays the digital sub-signal 101 by one invalid data period. The AND circuit 118 logically Adds the output 104 of the invalid data stream detector 111 and the output 105 of the switch 115 and supplies it to the selector 120. The sync pattern generator 119, AND circuit 118 and the delay circuit 114 are integral with the selector 120, although they are separately shown to facilitate the understanding.

An operation of the composite video signal multiplexer of FIG. 4 is now explained.

The analog video signal 102 applied to the apparatus is converted to the digital video signal 103 by the video A/D converter 116 and it is supplied to the selector 120. The sync signal period is detected by the sync separator 113 and the detection output is supplied to the switch 115. Since the analog video signal 102 is applied, the switch 115 supplies the detection output to the AND circuit 118. On the other hand, the invalid data stream of the digital sub-signal having the invalid data stream added thereto is detected by the invalid data stream detector 111 and the detection output 104 is supplied to the AND circuit 118. The invalid data stream is delayed by the delay circuit 114 by one invalid data period and is supplied to the selector 120. The AND circuit 118 logically Adds Performs an and operation or the detection output 104 of the invalid data stream detector 111 and the output 105 of the switch 115, that is, the sync period detected by the sync separator 113. Thus, the coincidence period of the period of the invalid data stream of the digital sub-signal and the sync period of the analog video signal is detected and it is outputted to the selector 120. The selector 120 outputs the sync pattern 107 from the sync pattern generator 119 when the detection output of the AND circuit 118 is present, and outputs the bits of the digital sub-signal and the digital video signal 103 when the detection output of the AND circuit 118 is absent. The output from the selector 120 is converted to a serial signal by the encoder 121 and outputted as the multiplexed signal 125.

The multiplexed signal 125 has the digital video signal and the digital sub-signal multiplexed, and has the sync pattern inserted thereto when the period of the invalid data stream of the digital sub-signal and the sync signal period of the analog video signal coincide, that is, at the period of the least multiple of those periods. Since the vertical sync signal period is longer than the horizontal sync signal period, the sync pattern is inserted at the vertical sync period.

A multiplexing operation is more specifically explained with reference to a time chart of FIG. 5.

Figure 5:
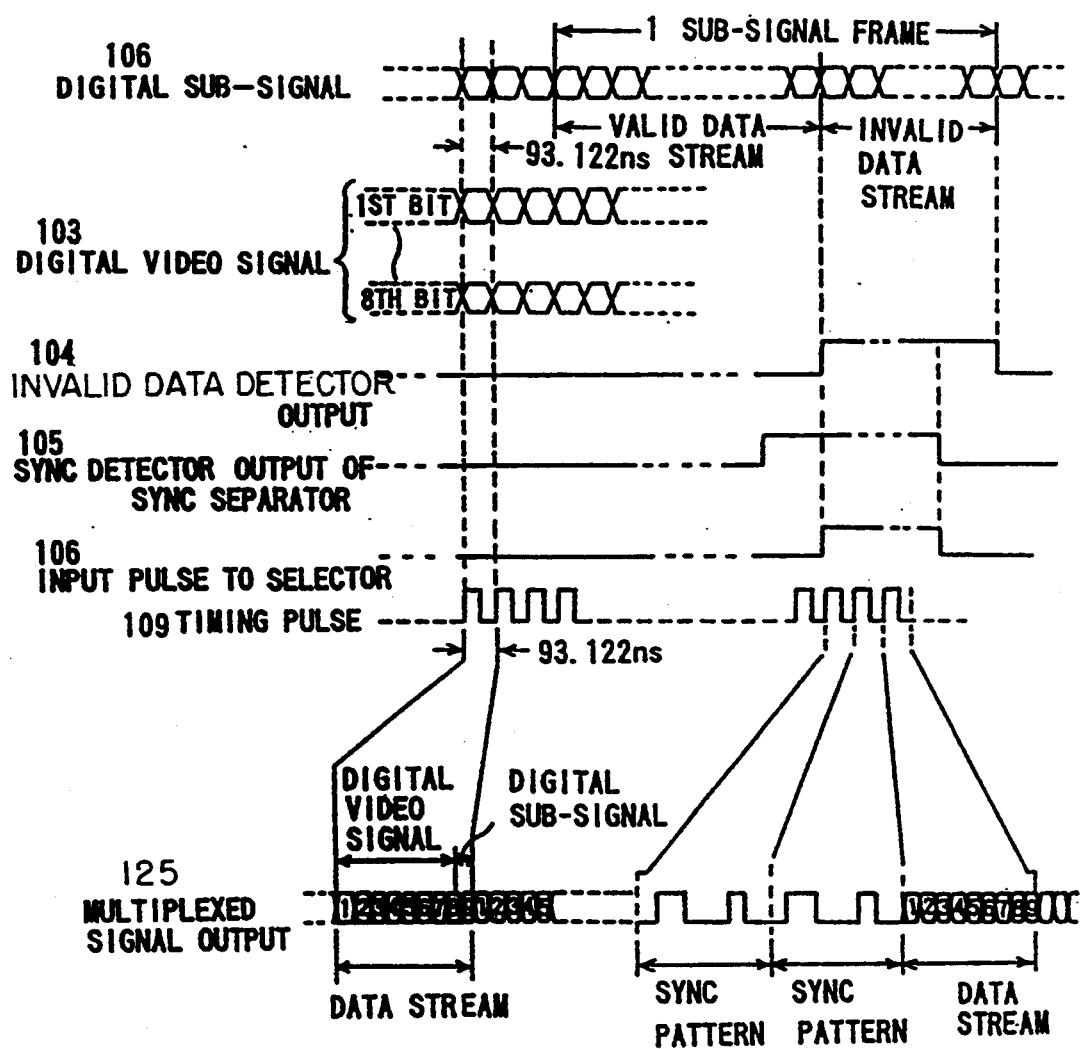
FIG. 5 shows a timing chart for an operation of the first embodiment of the present invention.

In FIG. 5, the analog video signal 102 is of the NTSC standard (line scan 63.5 us, horizontal sync period 4.7 us, color sub-carrier frequency 3.5795 Mhz), and a sampling Fate of the video A/D converter 116 is triple of the color sub-carrier frequency, that is, 10.7386 Mhz and a resolution power is 8 bits.

In the audio signal, the sampling rate is approximately 33–48 Khz and it is a much lower rate signal than the digital video signal. Therefore, in FIG. 5, the digital sub-carrier is multiplexed with several channels of the audio signal and data signals and the invalid data stream is inserted at the predetermined period to attain the data rate of 10.7386 Mhz.

When the detection output 104 of the invalid data stream detector 111 and the sync period detected by the sync separator 113 do not coincide, that is, when the period of the invalid data sequence of the digital sub-signal and the sync signal period of the analog video signal do not coincide, the multiplexed signal 125 is the serial signal comprising the first to eighth bits of the digital video signal and one bit of the digital sub-signal, as shown on the left side of FIG. 5.

When the detection output 104 of the invalid data stream detector 111 and the sync period detected by the sync separator 113 coincide, that is, when the period of the invalid data stream of the digital sub-signal and the sync signal period of the analog video signal coincide, the multiplexed signal 125 produces the sync pattern 107 when two timing pulses are generated by the timing pulse generator 117 and thereafter it is a serial signal comprising the first to eight bits of the digital video signal and one bit of the digital sub-signal as shown on the right side of FIG. 5.

In the multiplexed signal 125, the digital sub-signal has a transmission rate of more than 600 bits per line scan (63.5 $\mu$s) of the NTSC standard composite video signal. Assuming that 20% thereof is allocated to the invalid data to double the redundancy, the transmission rate is more than 240 bits per line scan (63.5 $\mu$s) of the NTSC standard composite video signal, and it is sufficient for the digital sub-signal.

The decoding of the multiplexed signal is now explained.

Figure 6:
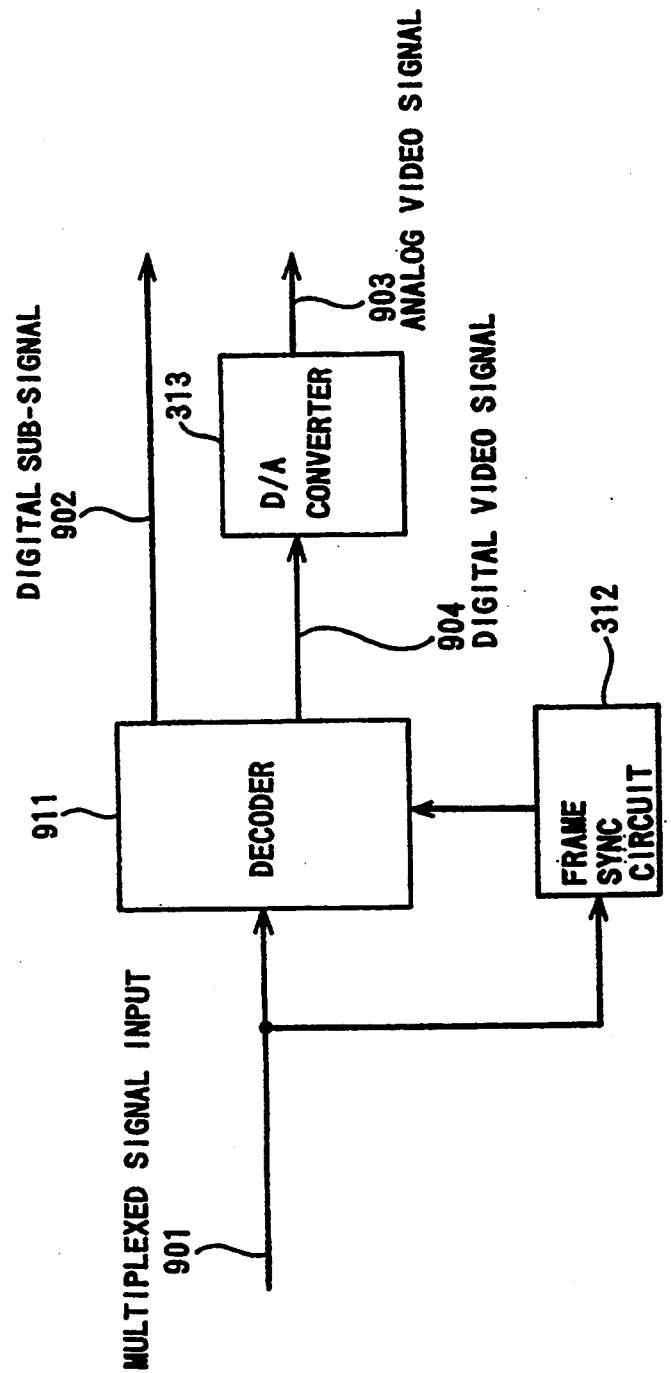
FIG. 6 shows a configuration of an apparatus at a receiving station.

An example of an apparatus for separating (decoding) the digital video signal and the digital sub-signal from the multiplexed signal 125 is shown in FIG. 6. The apparatus shown in FIG. 6 is essentially identical to that shown in FIG. 3. Since the sync pattern is inserted at the period equal to the least multiple of the period of the invalid data stream of the digital sub-signal and the period of the sync signal period of the analog video signal, the control signal in the frame sync circuit 312 must be stable. Preferably, the timing is generated by using a crystal oscillator. An improved operation may be attained by generating the timing by using the invalid data of the digital sub-signal.

Since the digital sub-signal reproduced by the present apparatus is not present in the sync period of the analog video signal, the delay of the transmission of the digital sub-signal is small.

Figure 1:
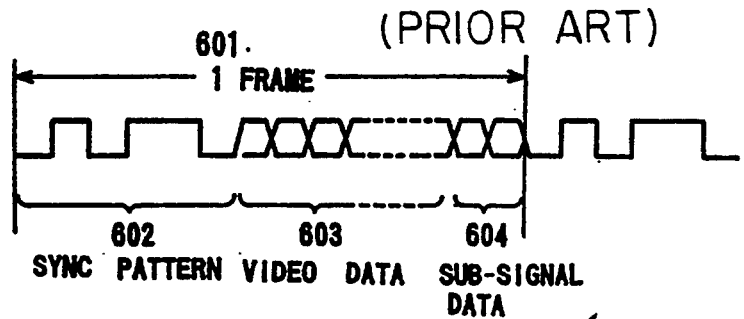
FIG. 1 shows prior art.
Figure 2:
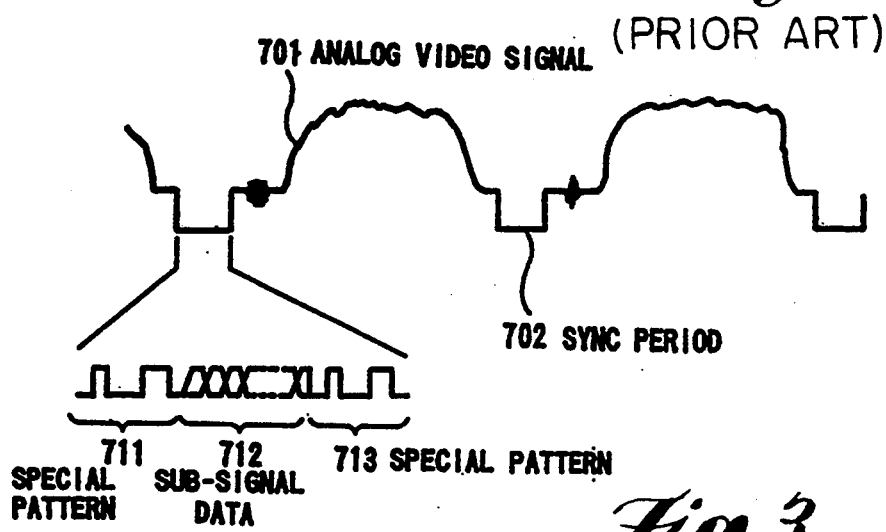
FIG. 2 shows prior art.
Figure 3:
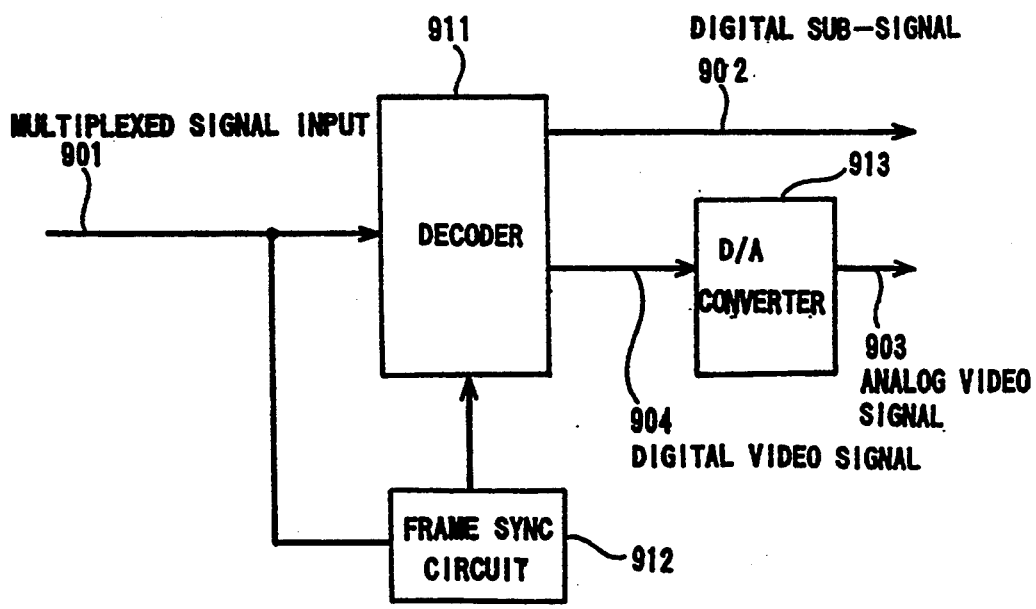
FIG. 3 shows prior art.

The decoding apparatus is not limited to those shown in FIGS. 3 and 6, but any equivalent apparatus may be used.

A second embodiment of the present invention is now explained with reference to FIG. 7. The same or equivalent elements to those of the first embodiment are only briefly explained or the explanation thereof is omitted.

Figure 7:
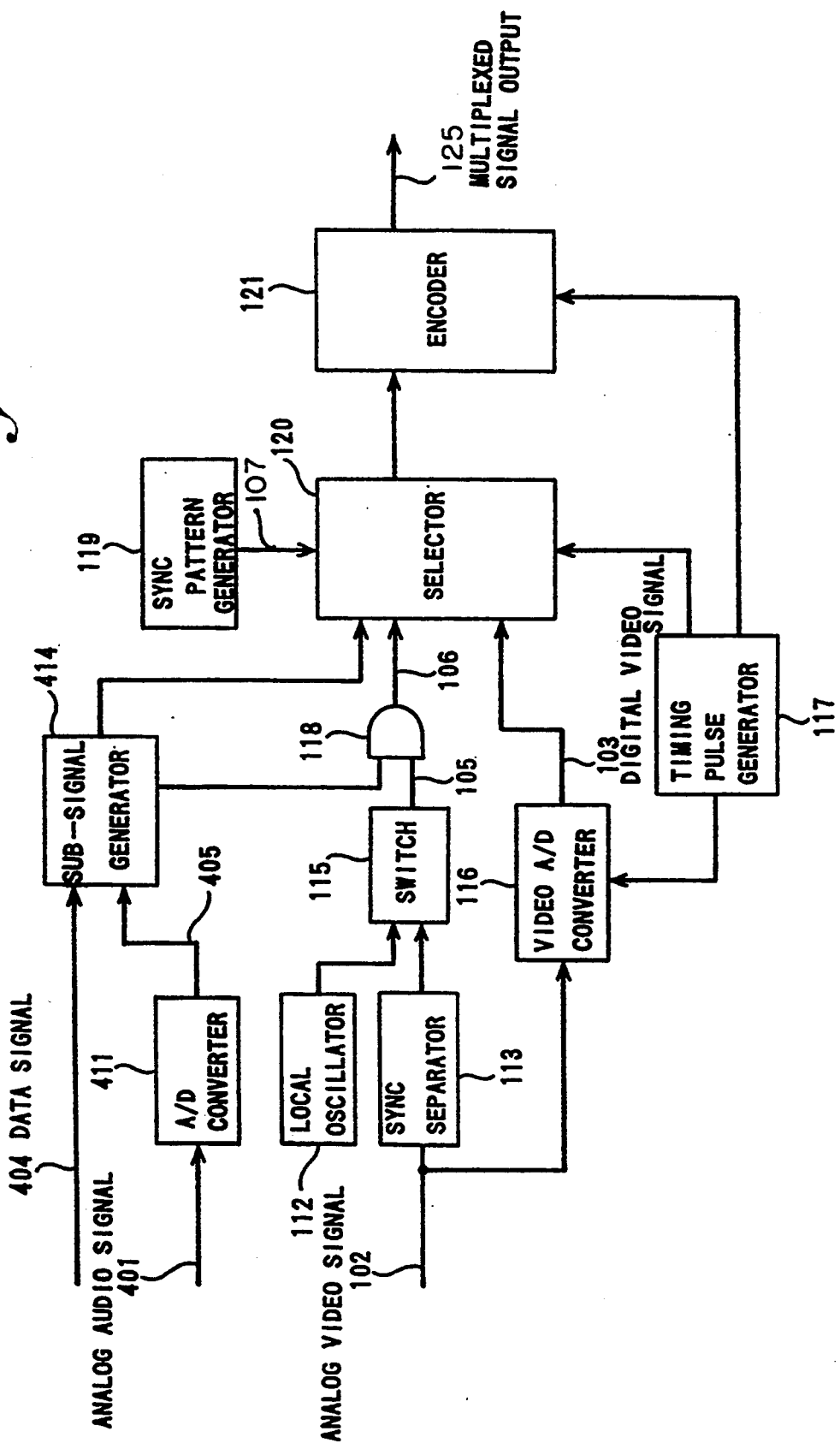
FIG. 7 shows a configuration of a second embodiment of the present invention.
Figure 10:
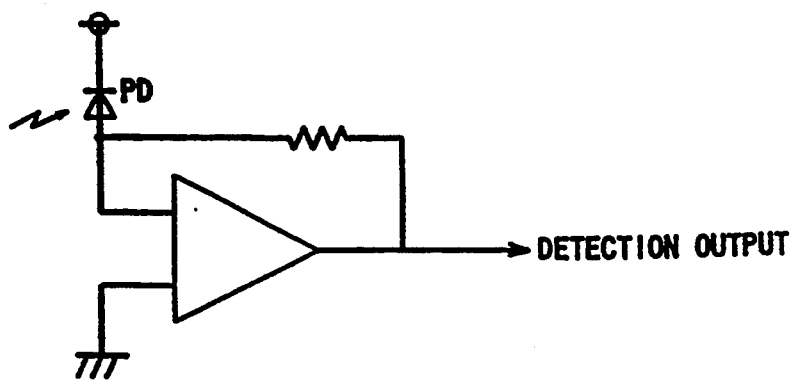
FIG. 10 shows a circuit by which an analog signal is obtained from a photo-sensor.

FIG. 7 shows an embodiment of the composite video signal multiplexer of the present invention. The composite video signal multiplexer shown in FIG. 7 differs from the first embodiment in that a low frequency analog signal and a data signal 404 are inputted and multiplexed, and an A/D converter 411 and a sub-signal generator 414 are provided. The low frequency analog signal is an analog audio signal 401 in FIG. 7, although it may be an analog output signal from a sensor such as a temperature sensor, a light sensor or a pressure sensor. FIG. 10 shows an analog output signal from the light sensor.

The A/D converter 411 converts the analog audio signal 401 to the digital audio signal 405 and it may have a sampling rate of 33–48 Khz as is usually used.

The sub-signal generator 414 provides the non-use period at the predetermined period to time-division multiplex the digital audio signal 405 and the data signal 404 and output it as the digital sub-signal as explained in the first embodiment, assuming that the analog video signal is of the NTSC standard, the sampling rate is approximately 10,7386 Mhz. Since the digital audio signal 405 and the data signal 404 are of a much lower rate, the amount of transmission is more than 200 bits when the data rate is converted to the sampling rate 10.7386 Mhz of the analog video signal. Thus, a sufficient non-use period is provided to form the digital sub-signal. The sub-signal generator 414 generates the digital sub-signal having the non-use period provided at the predetermined period and supplies it to the selector 120. The sub-signal generator 414 supplies the signal indicating the non-use period to the AND circuit 118 in the non-use period of the digital sub-signal.

An operation of the video signal multiplexer of FIG. 7 is now explained.

The analog video signal 102 applied to the apparatus is converted to the digital video signal 103 and then supplied to the selector 120. The sync signal period is detected by the sync separator 13 and is supplied to the switch 115, as in the first embodiment. The switch 115 supplies the detection output to the AND circuit 118.

On the other hand, the analog audio signal 401 is converted to the digital audio signal 405 by the A/D converter 411, and the digital audio signal 405 is supplied to the sub-signal generator 414. In the sub-signal generator 414, the digital audio signal 405 from the A/D converter 411 and the data signal 404 are time-division multiplexed with the non-use period being provided at the predetermined period, and it is supplied to the selector 120 as the digital sub-signal. In the non-use period of the digital sub-signal, the signal indicating the non-use period is supplied to the AND circuit 118.

In the AND circuit 115, the signal indicating the non-use period of the digital sub-signal and the output 105 of the switch 115, that is, the sync period detected by the sync separator 113 are logically Added. As a result, the coincidence period of the non-use period of the digital sub-signal and the sync signal period of the analog video signal is detected and it is supplied to the selector 120. The selector 120 supplies the sync pattern 107 from the sync pattern generator 119 when the detection output 106 of the AND circuit 118 is present, and supplies the bits of the digital sub-signal 101 and the digital video signal 103 when the detection output 106 is absent. The output from the selector 120 is converted to the serial signal by the encoder 121 and it is outputted as the multiplexed signal 125.

The multiplexed signal 125 has the sync pattern inserted when the period of the non-use period of the digital sub-signal and the sync signal period of the analog video signal coincide, that is, at the period of the least multiple of those periods.

When the analog video signal 102 has the same specification as that of the first embodiment, the multiplexed signal 125 is identical to that of FIG. 7.

The apparatus for separating the digital video signal and the digital sub-signal from the multiplexed signal 125 may be identical to that of the first embodiment.

A third embodiment of the present invention is now explained with reference to FIG. 8. The same or equivalent elements to those of the first or second embodiment are only briefly explained or the explanation thereof is omitted.

Figure 8:
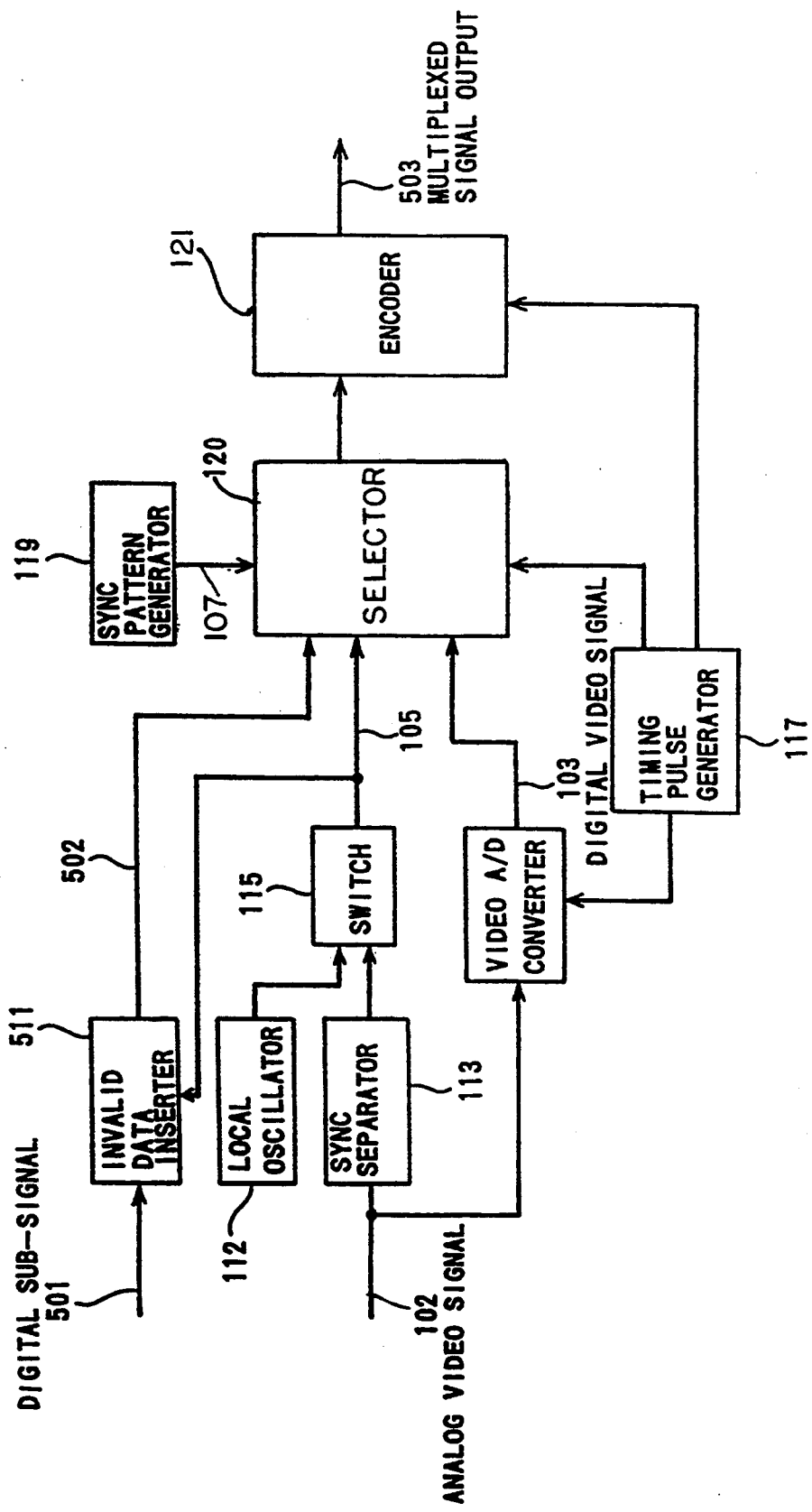
FIG. 8 shows a configuration of a third embodiment of the present invention.

FIG. 8 shows a composite video signal multiplexer which is an embodiment of the present invention. The composite video signal multiplexer shown in FIG. 8 differs from the first embodiment in that an invalid data inserter 511 for inserting the invalid data into the digital sub-signal 501 is provided in order to insert the invalid data into the digital sub-signal 102.

Figure 9:
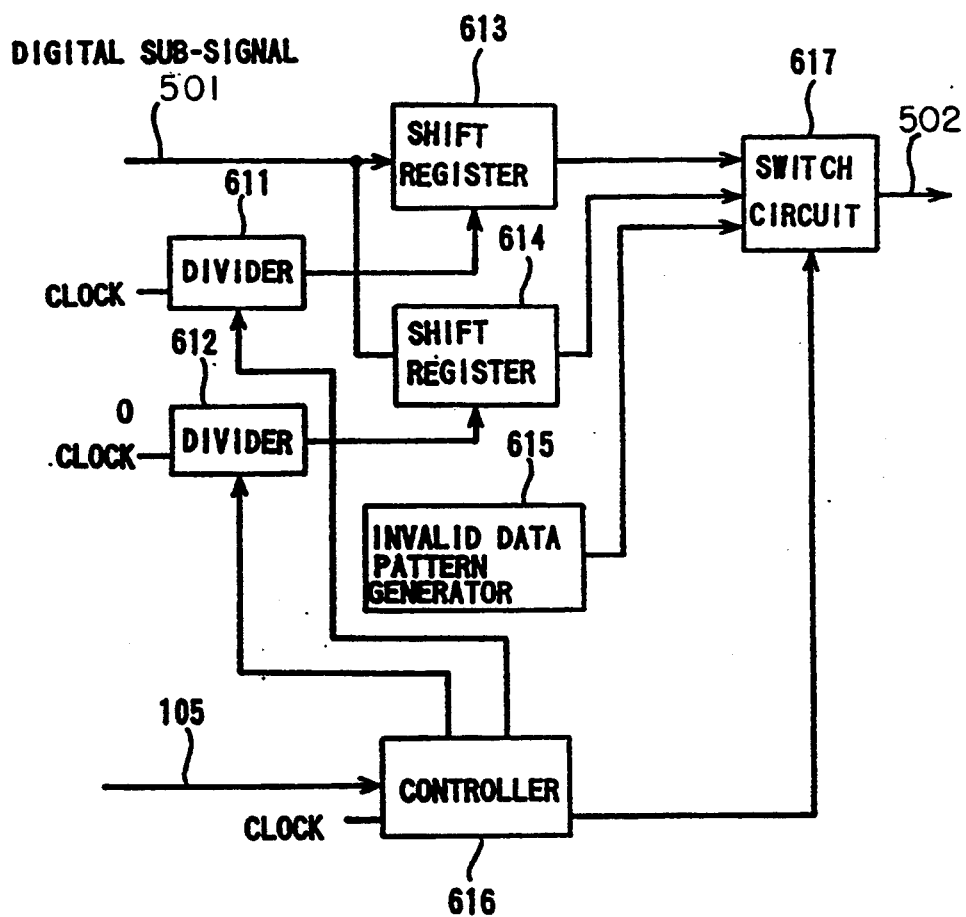
FIG. 9 shows a configuration of an invalid data inserter.

The invalid data inserter 511 inserts the invalid data into the digital sub-signal 502 when the detection output of the sync signal period of the analog video signal 501 is present. The invalid data inserter 511 is configured as shown in FIG. 9. A plurality of shift registers 613 and 614 for holding the digital sub-signal 501 and an output from an invalid data pattern generator for generating an invalid data pattern are switched (interleaved) by a switching circuit 617 by an external signal (the detection signal for the sync period) to insert the invalid data into the digital sub-signal 501.

An operation of the composite video signal multiplexer of FIG. 8 is now explained.

The analog video signal 102 applied to the apparatus is converted to the digital video signal 103 which is supplied to the selector 120. The sync period is detected by the sync separator 113 and the detection output is supplied to the selector 120 and the invalid data inserter 511 through the switch 115.

In the invalid data inserter 511, when the detection output for the analog video signal 102 from the switch 115 is present, the invalid data is inserted into the digital sub-signal 501 and it is supplied to the selector 120. Namely, the invalid data is inserted into the digital sub-signal 501 in the sync signal period of the analog video signal 102.

There selector 120 outputs the sync pattern 107 from the sync pattern generator 119 when the detection output 105 from the switch 115 is present, and outputs the bits of the digital sub-signal 501 and the digital video signal 103 when the detection output 105 is absent. The output from the selector 120 is converted to the encoder 121 and it is outputted as the multiplexed signal 503.

The sync pattern is inserted into the multiplexed signal 105 at the period of the sync signal period of the analog video signal when the period of the invalid data stream of the digital sub-signal and the sync signal period of the analog video signal coincide. This is same as the first embodiment in which the period of the invalid data stream of the digital sub-signal and the sync signal period of the analog video signal coincide. Since the invalid data stream is small in the digital sub-signal, the transmission rate is somewhat improved.

A modification of the embodiment is explained. The delay circuit 114 may be eliminated when the output from the delay circuit of the invalid data stream detector is used. Where the local oscillator 112 and the switch 115 are always used while the analog video signal 102 is applied, those circuits are not necessary because the output of the sync separator 113 is supplied to the AND circuit 118. Where it is desired not to include the sync pattern in the multiplexed signal during the vertical sync signal period, it may be eliminated by separating the vertical sync signal of the analog video signal and EXORing it with the input or the output of the AND circuit 118.

In accordance with the present invention, since the sync pattern is inserted at the period of the least multiple of the period of the invalid data stream of the digital sub-signal and the period of the sync signal period of the analog video signal or the period of the vertical sync signal period, the amount of transmission for the sync pattern is reduced and the increase of the transmission time is suppressed. Since the receiving station may use the conventional circuit configuration, the size of the apparatus does not increase. Further, since the digital sub-signal is not present in the sync signal period of the analog video signal, the delay of the transmission of the digital sub-signal is minimized.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. A method for multiplexing a video signal and a digital sub-signal comprising a plurality of bits and having an invalid period and valid period of a predetermined cycle, said method comprising the steps of:
    converting an analog video signal to a digital video signal comprising a plurality of bits and having a sync signal period;
    adding each bit of said sub-signal to said digital video signal to generate a digital signal stream;
    inserting a sync pattern into said digital signal stream when said invalid period of said sub-signal and the sync signal period overlap each other to generate an inserted digital signal in which said sync pattern is inserted at an interval corresponding to a least common multiple of said sync period and said invalid period; and
    digital-to-analog converting said inserted digital signal stream into an analog output signal.

2. The method of claim 1, wherein said invalid period includes an invalid data stream.

3. The method of claim 1, wherein said invalid period is a non-use period having no data representative of said sub-signal therein.

4. The method of claim 1, further comprising the steps of:
    inputting a low frequency analog signal separately from said analog video signal;
    converting said low frequency analog signal to said digital audio signal;
    multiplexing said digital audio signal and a predetermined data signal to generate said sub-signal; wherein
    said sub-signal includes a non-use period provided at a predetermined cycle.

5. The method of claim 2, wherein said invalid data stream is added during said sync signal period to generate said sub-signal.

6. A signal multiplexer for multiplexing a digital video signal and a digital sub-signal having an invalid period and a valid period at a predetermined cycle, said multiplexer comprising:
    first means for converting an analog video signal to said digital video signal;
    second means for detecting a sync period of said analog video signal; and
    third means for adding each but of said digital sub-signal to said digital video signal to generate a digital signal stream and for inserting a sync pattern into said digital signal stream when said invalid period of said digital sub-signal and the sync period overlap to generate an inserted digital signal stream in which said sync pattern is inserted at an interval corresponding to a least common multiple of said sync period and said invalid period.

7. The signal multiplexer according to claim 6, further comprising fourth means for digital-to-analog converting the digital signal stream into an analog output signal.

8. The signal multiplexer according to claim 6, wherein said first means is a video A/D converted for converting said analog video signal, and said second means is a sync separator for detecting said sync period.

9. The signal multiplexer according to claim 6, wherein an invalid data stream is inserted in said invalid period.

10. The signal multiplexer according to claim 6, said third means comprising:
    an invalid data stream detector for detecting said invalid data stream in said sub-signal; and
    selection means for adding each bit of said sub-signal to said digital video signal and for inserting said sync signal into said digital signal stream when said invalid data stream is detected by said invalid data stream detector and said sync period is detected by said second means.

11. The signal multiplexer according to claim 10 wherein said selection means includes:
    a sync pattern generator for generating said sync pattern; and
    a selection circuit for adding each bit of said sub-signal to said digital video signal and for selectively outputting said digital signal stream and said sync pattern in accordance with detection outputs of said invalid data stream detector and said second means.

12. The signal multiplexer according to claim 6 wherein said invalid period is a non-use period having no data representative of said sub-signal therein.

13. The signal multiplexer according to claim 6 further comprising:
    an A/D converter for analog-to-digital conversion of a low frequency analog signal separately inputted from said analog video signal into said digital sub-signal; and
    a sub-signal generator for multiplexing the digital video signal and the digital sub-signal during valid sync periods and providing a non-use period indicative of an invalid period having no data representative of said sub-signal;
    wherein said third means adds each bit of said sub-signal to said digital video signal and selectively outputs said digital signal stream or the sync pattern in accordance with said non-use period signal from said sub-signal generator and a detection output of said second means.

14. The signal multiplexer according to claim 13, wherein said low frequency analog signal is an audio signal or an analog output signal from a sensor.

15. The signal multiplexer according to claim 13, further comprising:
    an invalid data inserter for inserting an invalid data stream into said sub-signal in accordance with the detection output of said second means;
    wherein said third means includes a sync pattern generator for generating the sync pattern, and a selection circuit for adding each bit of said sub-signal to said digital video signal and selectively outputting said digital signal stream or the sync pattern in accordance with the detection output of said second means.

* * * * *